United States Patent Office 3,049,541
Patented Aug. 14, 1962

3,049,541
TRANSFORMATION OF CEPHALOSPORIN C
Edward Penley Abraham and Guy Geoffrey Frederick Newton, Oxford, and Clifford William Hale, Clevedon, England, assignors to National Research Development Corporation, London, England, a British corporation
No Drawing. Filed Mar. 12, 1959, Ser. No. 798,855
Claims priority, application Great Britain Mar. 17, 1958
5 Claims. (Cl. 260—243)

This invention is for improvements in or relating to the transformation of Cephalosporin C and has for an object to provide a transformation product having an enhanced activity against *Staph. aureus* in relation to a *Salm. typhi* as compared with the activity of Cephalosporin C itself.

According to the present invention there is provided a transformation product of Cephalosporin C, hereinafter referred to as Cephalosporin $C_C$, which is neutral, substantially stable to penicillinase, has an Rf value of 0.15 in paper chromatography with an aqueous solution of butanol and acetic acid, stable to normal hydrochloric acid and having a greater activity against *Staph. aureus* than against *Salm. typhi*; Cephalosporin $C_C$ shows an absorption band in the ultra-violet absorption spectrum similar to that of Cephalosporin C but having a maximum at 225 mµ.

The invention also includes a process for the production of Cephalosporin $C_C$ comprising treating Cephalosporin C in aqueous solution with hydrochloric acid of a normality of from 0.1 N to N; the treatment can conveniently be carried out at room temperature and the transformation takes place progressively over a period of hours rising to a maximum with 0.1 N hydrochloric acid in about 120 hours.

The Cephalosporin $C_C$ is somewhat unstable in N hydrochloric acid and gradually disappears after a period of about 72 hours at room temperature.

During the treatment of Cephalosporin C with hydrochloric acid, as above described, the Cephalosporin C gradually disappears and is gradually replaced by Cephalosporin $C_C$. The production of the transformation product can be seen from the following table:

*Formation of Cephalosporin $C_C$ From Cephalosporin C at 20° C.*

| Time (hours) | N HCl | | 0.1 N HCl | | 0.01 N HCl | |
|---|---|---|---|---|---|---|
| | Ceph $C_C$ formed | Ceph C remaining | Ceph $C_C$ formed | Ceph C remaining | Ceph $C_C$ formed | Ceph C remaining |
| 46 | 10 | 0 | 10 | 18 | Trace | 17 |
| 72 | Trace | 0 | 12 | 17 | | |
| 96 | 0 | 0 | 13 | 14 | 0 | Trace |
| 120 | | | 13.5 | 11 | | |
| 144 | | | 12 | Trace | | |

NOTE.—The solutions contained originally 20 mg./ml. of Cephalosporin C. The figures represent diameters in mm. of inhibition zones (*Staph. aureus*) produced by 100 µg. of material after electrophoresis on paper at pH 7. 100 µg. of Cephalosporin C produced a zone of 22 mm.

Cephalosporin $C_C$ can be separated from copresent Cephalosporin C by passing an aqueous solution containing both substances through a column of an anion exchange resin (such as Dow-1 or Amberlite IR4B) in the acetate form. Cephalosporin $C_C$, being neutral, rapidly passes through the column whilst the Cephalosporin C, which is an acid, is adsorbed.

Cephalosporin $C_C$ is at least four times as active against *Staph. aureus* as against *Salm. typhi* whereas Cephalosporin C itself is substantially of equal activity against both organisms. Electrophoresis paper shows that at a pH of 7, Cephalosporin $C_C$ has no net electric charge and on paper chromatograms run in an aqueous solution of butanol and acetic acid containing 4 parts of butanol and 1 part of acetic acid showed an Rf value of about 0.15 which is similar to that of Cephalosporin C itself.

Cephalosporin $C_C$ has a far greater stability towards penicillinase than penicillin, thus when utilising a highly purified preparation of pencillinase from *Bacillus cereus* there was no significant inactivation of a crude preparation of Cephalosporin $C_C$ containing 3 mg. per ml. when tested after 2 hours at 37° C., whereas a solution of benzyl penicillin containing 0.33 mg. per ml. was completely inactivated by the same penicillinase preparation.

We claim:
1. A process for the production of Cephalosporin $C_C$ comprising subjecting an aqueous solution of Cephalosporin C to the action of hydrochloric acid of a normality of from 0.1 N to N for a prolonged period of time not less than about 1 day.

2. A process according to claim 1 wherein the Cephalosporin C is subjected to the hydrochloric acid at room temperature.

3. A process according to claim 2 wherein the Cephalosporin $C_C$ is separated from unchanged Cephalosporin C present by passing an aqueous solution through a column of an anion exchange resin in acetate form whereby the Cephalosporin C is absorbed and the Cephalosporin $C_C$ passing through is collected.

4. The process of claim 1, in which the normality of the hydrochloric acid is 0.1 and the period of time is about 1 to 6 days.

5. The product produced by subjecting an aqueous solution of Cephalosporin C to the action of hydrochloric acid of a normality of from 0.1 to 1 N for a prolonged period of time of about 1 to 6 days, said product being a transformation product of the Cephalosporin C designated as Cephalosporin $C_C$ and having a greater activity against *Staph. aureus* than against *Salm. typhi* and showing maximum absorption in an ultra-violet absorption spectrum at 255 mµ and separating the Cephalosporin $C_C$ thus produced from copresent Cephalosporin C.

References Cited in the file of this patent
Nature, vol. 175, page 548 (1955).
Newton et al.: Biochem. J., vol. 62, pages 651–658 (1956).

Disclaimer 3,049,541.—*Edward Penley Abraham* and *Guy Geoffrey Frederick Newton*, Oxford, and *Clifford William Hale*, Clevedon, England. TRANSFORMATION OF CEPHALOSPORIN C. Patent dated Aug. 14, 1962. Disclaimer filed June 14, 1965, by the assignee, *National Research Development Corporation*.

Hereby enters this disclaimer to claim 5 of said patent.
[*Official Gazette September 14, 1965.*]